United States Patent
Glushko et al.

[11] 3,778,993
[45] Dec. 18, 1973

[54] METHOD OF MANUFACTURING TWISTED WIRE PRODUCTS

[76] Inventors: Mikhail Fedorovich Glushko, prospekt Shevchenko, 15/5, kv. 17; Viktor Klementievich Skalatsky, prospekt Gagarina, 2, kv. 21, both of Odessa, U.S.S.R.

[22] Filed: Dec. 7, 1971

[21] Appl. No.: 205,664

[52] U.S. Cl. .................................. 57/145, 57/166
[51] Int. Cl. .............................................. D07b 1/06
[58] Field of Search ................. 57/9, 139, 144, 145, 57/156, 161, 166

[56] References Cited
UNITED STATES PATENTS

| | | | |
|---|---|---|---|
| 3,383,704 | 5/1968 | Schoerner | 57/145 |
| 251,114 | 12/1881 | Hillidie | 57/145 |
| 3,234,722 | 2/1966 | Gilmore | 57/145 |
| 2,156,652 | 5/1939 | Harris | 57/145 |

*Primary Examiner*—Donald E. Watkins
*Attorney*—Holman & Stern

[57] ABSTRACT

A method of manufacturing twisted wire products having a core and at least one outer layer of wires laid about the core consists in arranging the outer layer of wires in two groups during manufacture; one group, which is a substantial fraction of the number of wires in the outer layer is twisted and disposed in contact with the core so as to form as many peripheral gaps as there are remaining wires other than those in the fraction; the second group of wires which are the remaining wires are disposed in periphearl gaps so formed, and laid radially away from the core and in contact with adjacent wires of the first group; the outer layer so arranged in two groups is subjected to radially compressive deforming forces so as to wedge the conductors of the second group into the peripheral gaps so as to produce a tight and improved twisted wire product. Circular wires of the same diameter may be used for the core and the outer layer. Twisted wire products having a plurality of outer layers may be produced by forming single outer layers as said and building them in succession; alternatively, the product may be formed in a single stage of plastic deformation and subsequent thermal treatment as required. The core may be of circular, oval, oblong or triangular shape.

3 Claims, 16 Drawing Figures

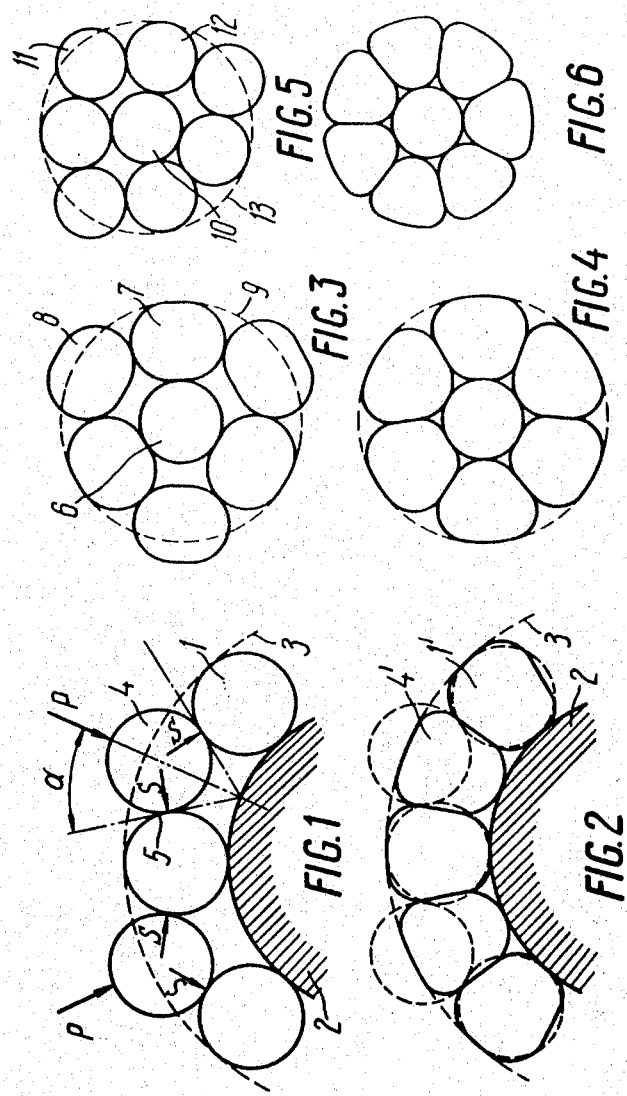

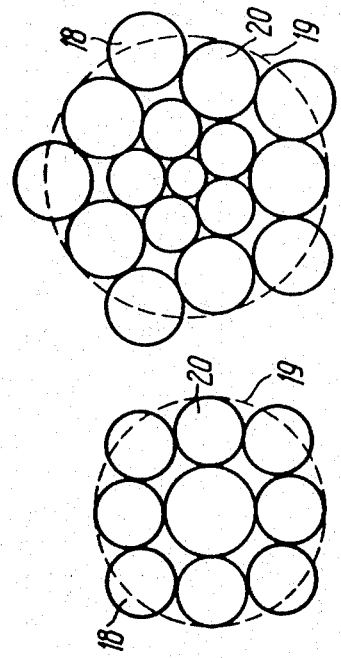
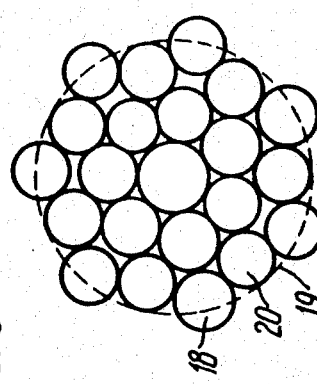
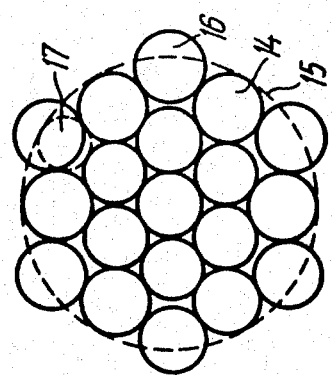
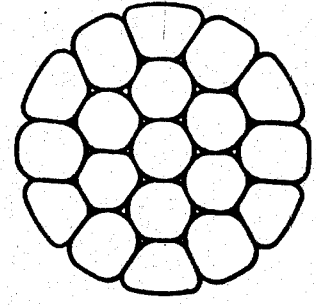

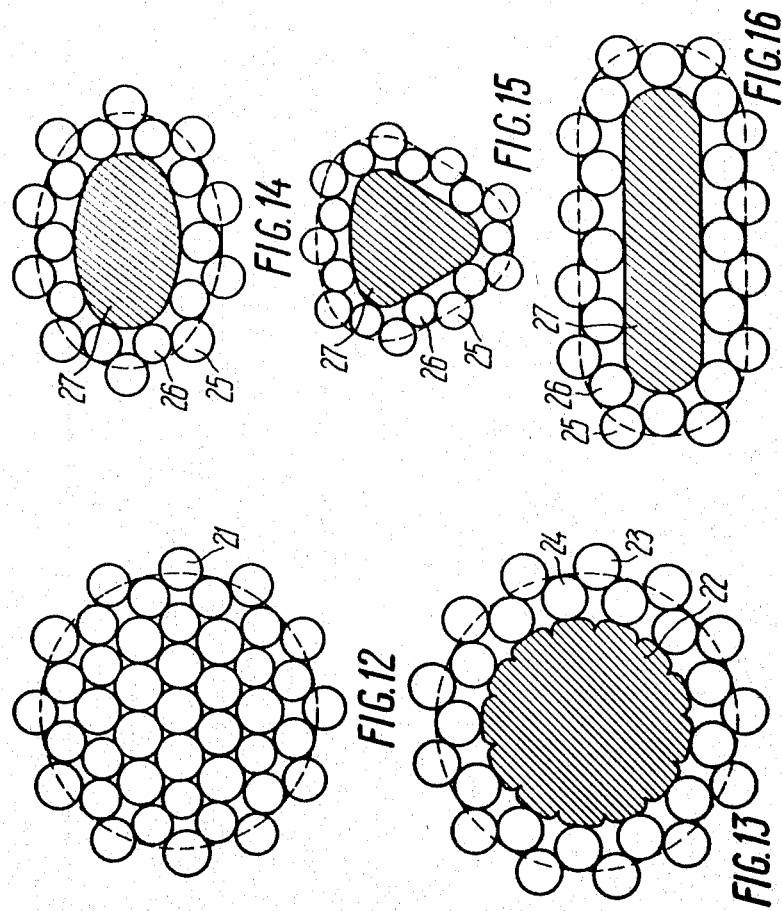

METHOD OF MANUFACTURING TWISTED WIRE PRODUCTS

BACKGROUND OF THE INVENTION

1. Field of the Invention

The present invention relates to production of cables and wire ropes and more particularly it relates to methods of manufacturing cables, cable strands and cores, armour of electric conductors and cable conductors, bimetallic cables of the aerial power transmission lines and other similar twisted wire products.

2. Description of Prior Art

Known in the art are the methods of manufacturing cables (Author's Certificate No. 55676. Cl.21, USSR) and wire ropes (Patent No. 794411, Great Briatin) comprising twisting of wire elements and their subsequent plastic reduction in the twisted state by drawing them through a reducing device.

Also known in the art is a method of manufacturing multiple rope strands (Patent No. 887963, Cl.84/4/, Great Britain) in which one or more layers of wire are laid about a core made in accordance with the above-mentioned Patent No. 794411 and are subjected in succession to plastic reduction.

In all the known methods of manufacturing twisted wire products the process of plastic reduction is applied to the elements that have been fully shaped in the course of twisting to a final shape, and, plastic reduction can be used either for twisting the fully shaped elements into a wire rope or as a separate product.

However, manufacture of wire products by these above described methods requires considerable forces for the deformation of wires during plastic reduction of the fully shaped elements.

The need for strong forces during plastic reduction is attributable firstly to the fact that plastic reduction is performed on the finished elements that have already acquired a final shape; secondly, the reducing device acts simultaneously and almost uniformly on all the outer wires when a round strand is drawn through a round pass, or on several adjacent wires of the outer layer when a round strand is reduced to a shaped profile. Inasmuch as all the wires of the product subjected to reduction occupy strictly definite places in accordance with their initial dimensions and cannot therefore be displaced relative to one another, and also in view of the fact that the reduction forces are applied uniformly along the entire external contour of the product or at least along the larger part thereof, there is a very small degree of freedom for lateral deformation of wires and displacement of the material, approaching the state of all-round lateral compression so that their deformation calls for strong forces that grow with the increasing degree of product reduction. In practice, at the highest degrees of reduction of such products, limited by their tensile strength during drawing through the reducing device, the wires retain rounded faces even after repeated reductions and the finished product contains hollow spaces inside, not filled with metal.

In known prior art methods, the number of the wires in the finished product and the size of wires in the product are selected to suit the diameter, construction and twisting procedures used in making said product.

Thus, the manufacture of the products by the above-mentioned methods calls for the use of a large number of different wire sizes.

SUMMARY OF THE INVENTION

An object of the present invention resides in providing a method which would diminish the reducing forces in the manufacture of twisted wire products.

Another object of the invention is to provide a method accepts lesser accuracy of the size and shape of the wires that make up the product and diminishes the number of different wire sizes required for the product manufacture.

Still another object of the invention is to provide twisted wire products manufactured by plastic reduction, the manufacture being simplified without sacrificing product quality.

Hereinbelow is described a method of manufacturing twisted wire products, e.g. wire ropes and cables made up of a core and at least one layer of external wires disposed surrounding the core, said method consisting in twisting the external wires, and subjecting them to plastic reduction by drawing through a reducing device. According to the invention, some of the wires in the external layer are so located prior to end during twisting that they stand out radially above the adjacent wires of said layer after; the wires so arranged surrounding the core are reduced by applying pressure of a reducing device, pressure being applied particularly to the protruding wires thereby wedging and forcing them in between the adjacent wires.

It is practicable during the manufacture of twisted wire products having two or more layers to have some of the wires in each layer protruding above the adjacent wires, that the layers are subjected to plastic reduction successively, one after another.

Owing to the use of the claimed method in a twisted wire product, if the wires of the product were replaced by round wires of equivalent cross sectional area, retaining the principle of mutual contact, at least one of the wires in the outer layer would stand out above them, protruding beyond an imaginary contour envelope described around the wires of the outer layer disposed around the core.

The method described and claimed herein requires reduced forces for the plastic reduction of the product due to the employment of the wedge effect produced by the specific arrangement of the wires in the product.

The method increases the maximum dimensions of the products subjected to plastic reduction at a given degree of reduction or increases the degree of reduction with the use of the same equipment.

The claimed method also ensures a high degree of filling with metal, of the cross sectional area of the product subjected to plastic reduction by means of comparatively small reduction forces.

The method of manufacturing twisted wire products described herein decreases the demands for the accuracy of wire sizes in the products since the geometrical nonconformity of these sizes with the place assigned for the wires in the product is compensated for by lateral deformation of the wires and by the redistribution of the wire material in the course of product shaping.

Besides, the claimed method tolerates a reduced accuracy of the dimensions and shapes of the product wires and the number of wire sizes required for manufacturing a single product.

The method of the present invention makes it possible to reduce the degree of nonuniformity of the mechanical properties of the products by standardizing the conditions of production and employing more rational procedures for the mechanical and thermal treatment of the wires which eventually improves the quality of the products.

The reduction of the total number of wire sizes in manufacturing the products of the same type simplifies the organization of their manufacture, cuts down the time required for refitting the equipment for other wire sizes, and simplifies the work related to the supply and storage of tools.

The claimed method is advantageous for devising new an improved structure of the products to suit the operational demands.

BRIEF DESCRIPTION OF THE DRAWINGS

Now the invention will be described in detail with reference to the drawings, in which:

FIG. 1 shows an arrangement of the wires in an outer layer of the product before plastic reduction;

FIG. 2 shows the arrangement of the wires in the outer layer of the product of FIG. 1 after plastic reduction;

FIGS. 3 and 4 show the cross sectional areas of the product, construction 1+6, before and after plastic reduction, respectively;

FIGS. 5 and 6 show the cross sectional areas of the product, construction 1+7, before and after plastic reduction, respectively;

FIGS. 7 and 8 show the cross sectional areas of the product, construction 1+6+12, before and after plastic reduction, respectively;

FIGS. 9, 10 and 11 show the cross sectional areas of the product, constructions 1+8, 1+5+10 and 1+7+14, respectively, before plastic reduction;

FIGS. 12 and 13 show the cross sectional areas of the multiple-layer products before subjecting them to plastic reduction as a whole and layer-by-layer, respectively;

FIGS. 14, 15, 16 show the cross sectional areas of the products of oval, triangular and flat shapes, respectively, before plastic reduction.

The claimed method is put into operation as follows.

The wires selected in number to suit the dimensions, shape, construction characteristics and other requirements of the product are twisted so that some of the outer layer of wires 1 (FIG. 1) are located on the core 2 of the product and is inscribed into the imaginary contour or envelope 3 while some of the wires 4 of the outer layer are located in the spaces between the adjacent wires 1 and stand out radially above the wires 1, protruding out of the envelope 3.

The core 2 is the center of the product construction. The core may consist of one or more wires, a single-layer or multiple-layer wire strand or any other member of sufficient strength, and suitable shape and dimensions.

The wires assembled in the above-described manner are then subjected to plastic reduction by drawing through a reducing device (not shown in the drawings). The reducing device sets on the protruding wires 4, forcing them between the wires 1 with pressure P.

Owing to such a relative arrangement of the wires, the external pressure P applied to the protruding wires is transmitted in the form of pressure S to the adjacent lower wires 1 at the point of the contact surfaces 5, the direction of the pressure S being inclined to the direction of the external pressure P at angle $\alpha$ which produces a certain amount of wedge effect during the transmission of forces. Under conditions of equilibrium of the protruding wires 4, the wedging pressure S will be $$S = P/2 \sin\alpha$$

It follows from the above that by selecting certain ratios between the dimensions of the wires 1 and 4 and the distance between the wires 1 it becomes possible to ensure a sufficiently small wedging angle $\alpha$ for obtaining comparatively strong wedging pressures S. This creates conditions for easier penetration of the protruding wires 4 into the envelope or contour 3 of the product.

As the protruding wires 4 penetrate into the contour 3 of the product, they become deformed, upsetting the adjacent wires 1. As a result, the wires 1 and 4 in the finished product (FIG. 2) acquire shaped profiles 1' and 4' respectively and are located inside envelope or said contour 3 or a contour approaching its dimensions.

The reducing devices can be constituted by one-piece or sectional dies, various reducing rolls and other metalworking tools.

The claimed method can be used for manufacturing diverse twisted wire products, namely spiral ropes, rope strands and cores, wire armour of electric cables, current-carrying cable conductors and the like.

In manufacturing twisted wire products subjected to plastic reduction and containing more than two layers of wire, each layer may be shaped and reduced in succession, using the inner already-reduced portion in the the core member for plastic reduction of the next layer.

Given below are the examples of twisted wire products manufactured by the claimed method which, in turn, can be used as component parts of other, more complicated products.

EXAMPLE 1

In FIG. 3 is shown one of the possible cross-sectional areas of the product, the so-called construction 1+6, wherein one central wire 6 is covered with a layer of six wires 7 and 8. As a result of twisting, the cross sections of the wires 7 and 8 approach an ellipse while the central wire 6 is of a round section. Assuming that all the wires of such a product are of the same size then, owing to the elliptical section of the wires 7 and 8, some of them protrude beyond the limits of the imaginary contour or envelope 9 described around the wires 7 laid about the wire 6.

Therefore, in the known methods of making such strands, correct laying of the wires 7 and 8 is ensured by making the diameter of the central wire 6 somewhat larger than that of the wires 7 and 8.

However, in manufacturing a product in accordance with the claimed method there is no need for a larger size for the central wire 6; on the contrary, loose laying of the wires 8 about the wire 6 is utilized for wedging. For this purpose some of the wires 7 are laid around the central wire or core 6 inside of the imaginary contour or envelope 9. The protruding wires 8 acted upon by the reducing device function as wedges and penetrate into the contour 9 of the product into the spaces between the wires 7.

As a result of these operations the finished product acquires the cross sectional area shown in FIG. 4. Other arrangements of the wires in the product are also feasible, for example with one or two protruding wires.

EXAMPLE 2

The claimed method can be utilized for manufacturing a product of construction of the so-called 1+7 type consisting of identical wires.

In this product a layer of seven wires 11 and 12 is laid about the central wire 10 (FIG. 5). FIG. 5 shows the cross sectional area of the wires in the product of construction 1+7 with three protruding wires 11. Other numbers of protruding wires 11 are possible too. The reducing device makes the protruding wires 11 penetrate into the spaces between the wires 12 and enter the contour 13 of the product section. After such a power reducing treatment, the cross sectional area of the finished product takes the shape illustrated in FIG. 6.

To simplify the drawings, the wires in FIGS. 5, 7, 9–16 are shown of a round shape.

The proposed method can also be utilized for manufacturing multiple-layer twisted wire products.

EXAMPLE 3

Shown in FIG. 7 is a cross section of a two-layer product, the so-called construction 1+6+12. The wires 14 of the outer layer are located inside the contour 15. The wires 16 located in the spaces between the wires 14 protrude beyond the limits of the contour 15. In the prior art methods for manufacturing such constructions, the protruding wires 16 are replaced by the wires 17 of a smaller diameter so that they contact the adjoining wires 14 and remain inside the contour 15.

While manufacturing this product in accordance with the claimed method, the protruding wires 16 are forced by the reducing device into the contour 15, transmitting pressure to the other wires. The wires 14 inside the contour 15 are upset but, due to their twisting, are not forced out of the contour 15 but are held in place by their remaining portion that has already been reduced and is located beyond the zone of action of the reducing device. As a result, all the wires are deformed and change both their cross-sectional shape, the cross section of the finished product acquiring the shape illustrated in FIG. 8.

Because of the differences in the conditions of reduction, the wires 14 and 16 in the finished product may take different cross sectional shapes. Under some conditions of product shaping it is possible that one or more wires of the outer layer may pass into the inner layer if there is a certain clearance between the wires of said inner layer, this being accompanied by the wedging effect. The passage of the wires from one layer into another does not impair the quality of the product.

EXAMPLE 4

Shown in FIGS. 9, 10, 11 are the cross sections of the products of constructions of the 1+8, 1+5+10 and 1+7+14 type respectively.

Owing to the protruding wires 18, these products are all not round in shape before plastic reduction. The wires 18 protruding beyond the contour 19 are located in the spaces between the inner wires 20 and are used as wedges during plastic reduction.

This principle can be utilized for many other types of wire arrangement to be used in manufacturing a multitude of other products.

EXAMPLE 5

The multiple-layer products, particularly three-layer twisted wire products, may be manufactured by two methods: either the product is subjected to plastic reduction in the already twisted state (FIG. 12) or it is reduced layer by layer (FIG. 13).

In the first case the role of wedges in the entire quantity of wires in the product is played by the protruding wires 21 (FIG. 12).

In the second case each successive layer of wires is laid about the inner part 22 (hatched in FIG. 13) that has already been reduced according to the claimed method so that some wires of the outer layer 23 protrude above the wires 24 and function as wedges during plastic reduction.

The principle of plastic reduction utilizing the wedge effect can be used in manufacturing the products with the cross sectional areas other than round, for example oval, triangular, flat, etc.

EXAMPLE 6

Shown in FIGS. 14, 15 and 16 are the arrangements of the outer layer of wires 25 and 26 laid about the core 27 of an oval, triangular and flat shape, respectively. The wires 25 are located in the spaces between the wires 26 laid about the core 27, protruding above them. In the course of plastic reduction the wires 25 are deformed themselves and simultaneously deform the wires 26 and, in some cases, the wires of the core 27.

What is claimed is:

1. A method of manufacturing twisted wire products, such as cables and wire ropes consisting of a core with at least one layer of outer wires laid about said core, said method comprising the following operations: twisting and arranging said outer wires of at least one layer to dispose a fraction of the number of said outer wires around and in contact with said core and forming as many peripheral gaps between wires so laid in contact with the core as there are remaining wires which are wires other than said fraction of said outer wires; locating said remaining wires in said peripheral gaps to be radially away from and out of contact with said core but in contact with adjacent wires of said fraction so as to protrude radially outwardly of the wires of said fraction; performing plastic reduction of all the twisted wires of the product by applying radial pressure of a reducing device to the protruding wires of the outer layer and using said protruding wires as wedges forced in between the adjacent wires, so as to form a twisted wire product of a desired cross section.

2. A method according to claim 1 wherein in manufacturing the twisted wire products which consists of a plurality of layers, the method includes the step of arranging some wires in each layer protruding above the adjacent wires, and the step of performing plastic deformation by reduction of said plurality of layers in succession, one after another.

3. A twisted wire product comprising: a core member with at least one layer of outer wires laid about said core member and shaped by reduction and radial compression, at least some of said wires having a non-circular cross section and substantially radial sides, whereby if the wires of the product were replaced by round wires of equivalent cross section area, retaining a principle of mutual contact, then one half or less of the wires composing the outer layer would stand out above the rest of the wires so as to protrude from an imaginary contour described around the outer layer of wires laid about the core.

* * * * *